(12) United States Patent
Nelson et al.

(10) Patent No.: US 11,565,447 B2
(45) Date of Patent: Jan. 31, 2023

(54) SPACER FOR A MANUFACTURED STRUCTURE

(71) Applicant: SMART ROCK FENCING, LLC., Holladay, UT (US)

(72) Inventors: Ted W. Nelson, Salt Lake City, UT (US); David J. Black, Holladay, UT (US); R. Dru Laws, Lake Mills, WI (US)

(73) Assignee: Smart Rock Fencing, LLC, Salt Lake City, UT (US)

( * ) Notice: Subject to any disclaimer, the term of this patent is extended or adjusted under 35 U.S.C. 154(b) by 265 days.

(21) Appl. No.: 17/092,028

(22) Filed: Nov. 6, 2020

(65) Prior Publication Data

US 2021/0138690 A1 May 13, 2021

Related U.S. Application Data

(60) Provisional application No. 62/932,345, filed on Nov. 7, 2019.

(51) Int. Cl.
| | |
|---|---|
| *B29C 41/04* | (2006.01) |
| *B29C 41/20* | (2006.01) |
| *B29C 33/12* | (2006.01) |
| *B29C 41/02* | (2006.01) |
| *E04C 2/34* | (2006.01) |
| *B29L 24/00* | (2006.01) |
| *B29K 105/20* | (2006.01) |

(52) U.S. Cl.
CPC .............. *B29C 41/20* (2013.01); *B29C 33/12* (2013.01); *B29C 41/025* (2013.01); *B29C 41/04* (2013.01); *B29K 2105/20* (2013.01); *B29L 2024/00* (2013.01)

(58) Field of Classification Search
CPC ..... B29C 33/12; B29C 33/123; B29C 33/126; B29C 33/14; B29C 33/16; B29C 33/18; B29C 41/04; B29C 41/042; B29C 41/045; B29C 41/047; B29C 41/06; E04C 2/34; E04C 2002/3488
See application file for complete search history.

(56) References Cited

U.S. PATENT DOCUMENTS

| | | | | |
|---|---|---|---|---|
| 6,180,203 | B1 * | 1/2001 | Unkles | B32B 5/32 108/51.11 |
| 7,478,797 | B2 * | 1/2009 | Laws | E04H 17/168 52/316 |
| 9,091,069 | B2 * | 7/2015 | Marandos | B29C 39/08 |
| 10,472,825 | B2 * | 11/2019 | Marandos | E04C 2/46 |
| 2019/0292809 | A1 * | 9/2019 | Nelson | E04H 17/006 |

* cited by examiner

*Primary Examiner* — Atul P. Khare
(74) *Attorney, Agent, or Firm* — Perry S. Clegg; Johson & Martin, P.A.

(57) ABSTRACT

Apparatuses, methods, and systems are disclosed for a spacer for a manufactured structure. A spacer includes a plurality of legs where each leg includes an elongate member that extends from a proximal end to a distal end. The proximal end of each leg is connected to one another at a central point such that the legs are spaced radially about the central point and substantially equidistant from one another. The distal ends of the legs include a material that has a predefined melting point such that the distal ends attach to a surface in contact with the distal ends responsive to the predefined melting point being reached during a molding process.

20 Claims, 5 Drawing Sheets

SPACER FOR A MANUFACTURED STRUCTURE

CROSS-REFERENCES TO RELATED APPLICATIONS

This application claims the benefit of U.S. Provisional Patent Application No. 62/932,345 entitled "SPACER FOR A MANUFACTURED STRUCTURE" and filed on Nov. 7, 2019, for Ted W. Nelson, which is incorporated herein by reference.

FIELD

This invention relates to a spacer and more particularly relates to a spacer for a manufactured structure.

BACKGROUND

Manufactured structures with relatively large areas defining internal voids can suffer from instability. Attempts to stabilize these sections of manufactured structures include void-spanning or gap-spanning formations. In molded structures, "kiss-offs" are created which are points formed in the structure at which the surface is deformed to bridge a separation between two portions through the void and create contact between opposite portions or sides of the structure. In implementing stabilization approaches, the opposite portions of the manufactured structure cannot be truly flat as the kiss-offs or other deformations result in depressions, pits, rises, or other irregularities in the surface of the structure and provide only a singular point of contact at each kiss-off or other connection.

SUMMARY

An apparatus for a spacer for a manufactured structure is disclosed. A system and method also perform the functions of the apparatus.

In one embodiment, a spacer includes a plurality of legs where each leg includes an elongate member that extends from a proximal end to a distal end. The proximal end of each leg, in certain embodiments, is connected to one another at a central point such that the legs are spaced radially about the central point and substantially equidistant from one another. The distal ends of the legs, in various embodiments, include a material that has a predefined melting point such that the distal ends attach to a surface in contact with the distal ends responsive to the predefined melting point being reached during a molding process.

In one embodiment, a system includes a structure comprising a first surface and a second surface. The system, in various embodiments, includes at least one spacer located within a cavity formed between the first and second surfaces, the at least one spacer comprising a plurality of legs where each leg includes an elongate member that extends from a proximal end to a distal end. The proximal end of each leg, in certain embodiments, is connected to one another at a central point such that the legs are spaced radially about the central point and substantially equidistant from one another. The distal ends of the legs, in various embodiments, include a material that has a predefined melting point such that the distal ends attach to a surface in contact with the distal ends responsive to the predefined melting point being reached during a molding process.

A method, in one embodiment, includes placing materials into a mold to form a molded structure. In some embodiments, a method includes placing at least one spacer into the mold, the at least one spacer comprising a plurality of legs where each leg includes an elongate member that extends from a proximal end to a distal end. The proximal end of each leg, in certain embodiments, is connected to one another at a central point such that the legs are spaced radially about the central point and substantially equidistant from one another. The distal ends of the legs, in various embodiments, include a material that has a predefined melting point such that the distal ends attach to a surface in contact with the distal ends responsive to the predefined melting point being reached during a molding process. In certain embodiments, a method includes a molding process for forming the materials into the molded structure such that the at least one spacer is located within a cavity of the molded structure and are configured to provide structural support to the molded structure by adhering to different surfaces of the molded structure during the molding process.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

In one embodiment, a spacer includes a plurality of legs where each leg includes an elongate member that extends from a proximal end to a distal end. The proximal end of each leg, in certain embodiments, is connected to one another at a central point such that the legs are spaced radially about the central point and substantially equidistant from one another. The distal ends of the legs, in various embodiments, include a material that has a predefined melting point such that the distal ends attach to a surface in contact with the distal ends responsive to the predefined melting point being reached during a molding process.

In one embodiment, the legs from the proximal end and up to, but not including, the distal ends comprises a material that has a different melting point than the material that the distal ends comprise. In some embodiments, the material for the distal ends comprises a polymeric material and the material for the legs from the proximal end and up to, but not including, the distal ends comprises a metallic material.

In some embodiments, the polymeric distal ends are attached to the metallic material of the legs by inserting a portion of the distal ends into a channel in the legs, by being threaded onto the legs, by being molded onto the legs, and/or by being snapped onto the legs. In certain embodiments, the polymeric material comprises a combination of a plurality of different polymers and additives.

In one embodiment, the material for the distal ends comprises a different color than the material for the legs from the proximal end and up to, but not including the distal ends. In certain embodiments, the different colors indicate different material properties of the material. In various embodiments, the distal ends attach to the surface by at least one of a chemical bond and a mechanical bond.

In one embodiment, at least a pair of legs of the plurality of legs are oriented opposite one another along a linear axis. In some embodiments, the at least a pair of legs of the plurality of legs are oriented perpendicular to another pair of legs of the plurality of legs that are oriented opposite one another along a different linear axis.

In one embodiment, the plurality of legs comprises three pairs of legs, each pair oriented along a linear axis that is perpendicular to a different linear axis that a different pair of legs is oriented along. In some embodiments, a length of the pair of legs from a distal end of a first leg of the pair to a distal end of a second leg of the pair is longer than a length of a cavity of a molding die used in the molding process.

In one embodiment, each of the plurality of legs is uniform in shape and length. In certain embodiments, at least one leg of the plurality of legs has a shape and/or length that is different than the other legs of the plurality of legs. In one embodiment, the legs gradually narrow along the elongate member from the proximal end to the distal end.

In one embodiment, a system includes a structure comprising a first surface and a second surface. The system, in various embodiments, includes at least one spacer located within a cavity formed between the first and second surfaces, the at least one spacer comprising a plurality of legs where each leg includes an elongate member that extends from a proximal end to a distal end. The proximal end of each leg, in certain embodiments, is connected to one another at a central point such that the legs are spaced radially about the central point and substantially equidistant from one another. The distal ends of the legs, in various embodiments, include a material that has a predefined melting point such that the distal ends attach to a surface in contact with the distal ends responsive to the predefined melting point being reached during a molding process.

In one embodiment, the first surface, the second surface, and the distal ends of the legs comprise polymeric materials. In certain embodiments, a linear size of the spacers is greater than a length of the cavity between a first molding die and a second molding die used in the molding process to form the first and second surfaces. In various embodiments, an amount and size of the at least one spacer is determined according to a size of the cavity and/or a determined structural strength of a structure formed of the first and second surfaces.

A method, in one embodiment, includes placing materials into a mold to form a molded structure. In some embodiments, a method includes placing at least one spacer into the mold, the at least one spacer comprising a plurality of legs where each leg includes an elongate member that extends from a proximal end to a distal end. The proximal end of each leg, in certain embodiments, is connected to one another at a central point such that the legs are spaced radially about the central point and substantially equidistant from one another. The distal ends of the legs, in various embodiments, include a material that has a predefined melting point such that the distal ends attach to a surface in contact with the distal ends responsive to the predefined melting point being reached during a molding process. In certain embodiments, a method includes a molding process for forming the materials into the molded structure such that the at least one spacer is located within a cavity of the molded structure and are configured to provide structural support to the molded structure by adhering to different surfaces of the molded structure during the molding process.

Figure 1A:
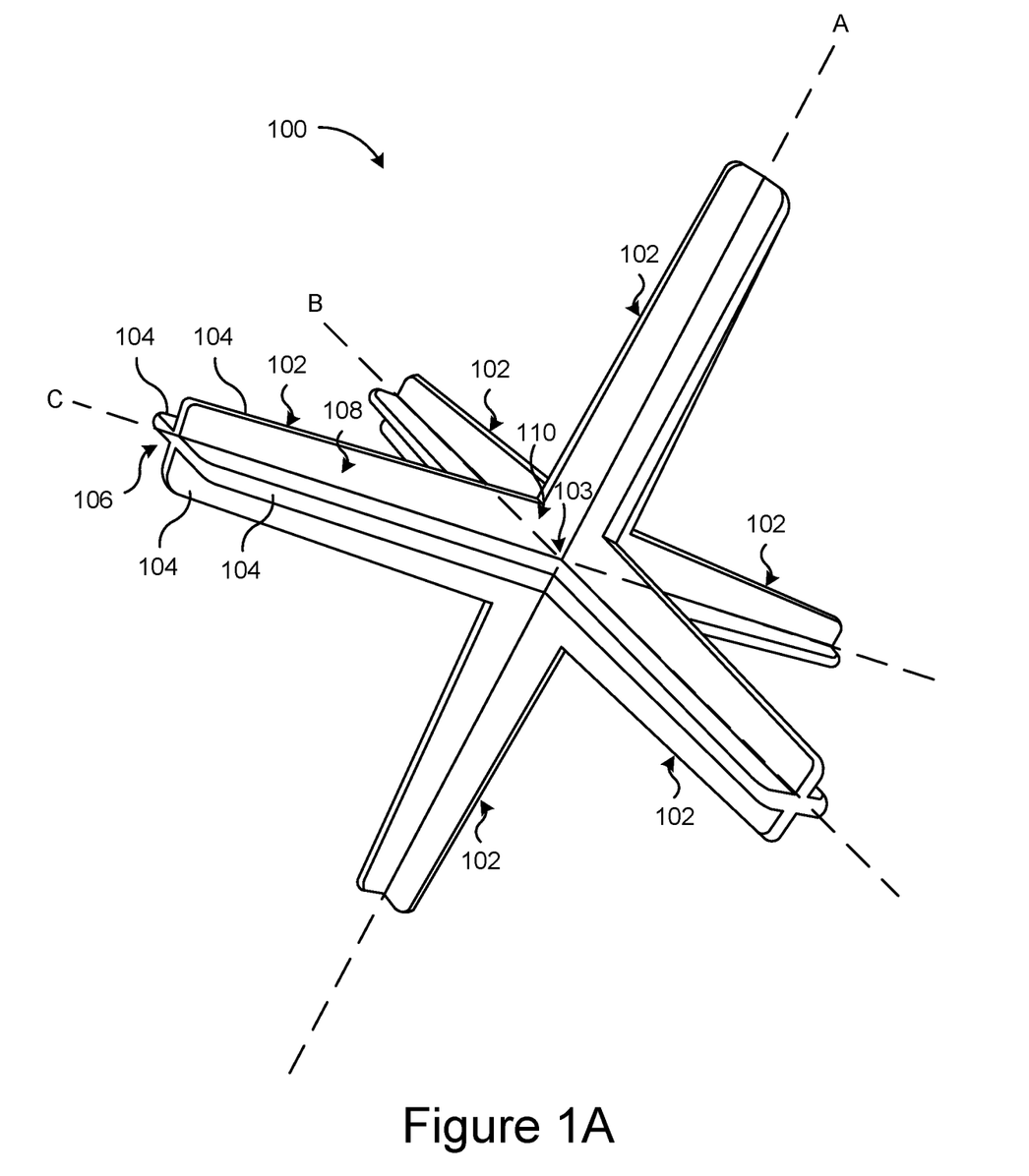
FIG. 1A is a perspective view of one embodiment of a spacer for supporting a manufactured structure in accordance with the subject matter disclosed herein.

Referring now to FIG. 1A, a perspective view of one embodiment of a spacer 100 for supporting a manufactured structure in accordance with one or more aspects of the subject matter disclosed herein is shown. As seen in FIG. 1A, the spacer 100 includes a plurality of legs 102 radiating, protruding, or extending outward from a center 103 of the spacer 100. In one embodiment, the legs 102 include a distal end 106 and a proximal end 110 that forms an elongate member 108 between the distal 106 and the proximal ends 110. In certain embodiments, the proximal ends 110 of each leg 102 is connected to one another at the center 103 of the spacer 100 such that the legs 102 are spaced radially about the central point 103 and, in some embodiments, substantially equidistant from one another.

In one embodiment, at least a pair of legs 102 are oriented opposite one another along, but oriented co-linearly along a linear axis A, B, C. For instance, the illustrated embodiment includes six legs 102 with each leg 102 arranged perpendicular to four of the legs 102 and parallel and coaxial with another of the legs 102 along a linear axis A, B, C. In other words, the depicted embodiment illustrates three pairs of legs 102 where each pair of legs 102 includes legs 102 that are oriented opposite one another and co-linear along a linear axis A, B, C such that the pairs of legs 102 are oriented perpendicular to another pair of legs 102 that includes legs 102 that are oriented opposite one another and co-linearly along a different linear axis A, B, C.

While the illustrated embodiment includes six legs 102, other embodiments may include fewer or more legs 102 which may be arranged at angles relative to one another so as to be extended outward symmetrically or non-symmetrically around the spacer 100. In some embodiments, the number of legs 102 and particular angle or arrangement of the legs 102 may be selected to accommodate a specific application or for other reasons.

In the illustrated "jack" arrangement, the six legs 102 are positioned to contact and provide support for parallel or near-parallel structures or surfaces with half of the plurality of legs 102 contacting one structure or surface and the other half of the plurality of legs 102 contacting another structure or surface. In some embodiments, each leg 102 is positioned and configured to be in contact with the plane of a corresponding structure. In other embodiments, one or more of the legs 102 is positioned to support a potential curvature or other surface variation in the structure.

In the illustrated embodiment, the legs 102 of the spacer 100 have an "x" or "+" cross-sectional shape formed by a plurality of flanges 104. This cross-sectional geometry may provide improved strength at a reduced material and weight cost. Each leg 102 is shown as having a taper with the flanges 104 reducing in size as the corresponding leg 102 extends outward such that each leg 102 has a reduced cross-sectional size near the distal ends of the legs 102. In other embodiments, the legs 102 may have no taper or may have other variations in the cross-sectional geometry. Each of the legs 102 may be identical or may differ from one or more of the other legs 102 of the spacer 100. While the embodiment of FIG. 1A shows a particular cross-sectional geometry, other geometries may also be implemented, e.g., square, triangular, round, diamond, or the like. In certain embodiments, the legs 102 are wider or thicker near the proximal ends 110 and gradually become narrower or skinnier towards the distal ends 106.

In some embodiments, the spacer 100 is injection molded. Alternatively, the spacer 100 may be at least partially machined, 3D printed, urethane poured, extruded, forged, sintered, or the like. For example, the spacer 100 may be injection molded and then machined or tumbled to a desired geometry, tolerance, surface quality, or the like. Other manufacturing or processing may be implemented to form, shape, refine, or otherwise impact a parameter of the spacer 100.

In some embodiments, the spacer 100 is monolithic. For example, each spacer 100 may be injection molded, cast, printed, or otherwise formed as a single piece. In other embodiments, the spacer 100 may include two or more parts joined together. For example, each leg 102 may be separately created and joined to form the spacer 100. Alternatively, a central frame (e.g., a metal frame) or core may be formed, and an attachment, support, coating, or other component may be added.

The spacer 100 may include one or more materials. In some embodiments, the spacer 100 is formed of one or more polymeric materials, e.g., a polyethylene and/or other thermoplastic. Other polymers may also be used. In some embodiments, the spacer 100 may include metals, glasses, fibers, fills, composites, or the like. Other additives may be added to the spacer 100 during molding of the spacer 100 such as pigments, flow promoters, compatibilizers, UV stabilizers/inhibitors, oxidation prohibitors, and/or the like. A single material or combination of materials may be used. In the case of more than one material making up the spacers 100, each material may be arranged in distinct regions within the spacer 100 or a gradient may be formed between one material and another. In some embodiments, the material(s) of the spacer 100 are selected based on the structure which the spacer 100 will support.

In certain embodiments, as described in more detail below, the spacers 100 are used as part of a molding process for a different product, structure, or the like. For instance, spacers 100 may be inserted into the cavity of a mold as part of the material that is used to form a particular structure shaped by the mold during a molding process such as rotational molding, roto-molding, roto-casting, and/or the like. The spacers 100 may be of a material that has a different melting point that the material used to form the structure such that the spacers 100 substantially maintain their shapes, structures, rigidness, strength, or the like during the molding process.

In certain embodiments, the distal ends 106 of the legs 102 are comprised of a material that has a predefined melting point such that the distal ends 106 attach to a molded surface that comes in contact with the distal ends 106 in response to the predefined melting point being reached during the molding process. In this manner, the spacers 100 attach to two opposing surfaces within the cavity of the structure to provide strength, support, or the like to the overall structure that the two opposing surfaces are molded to form.

Figure 1B:
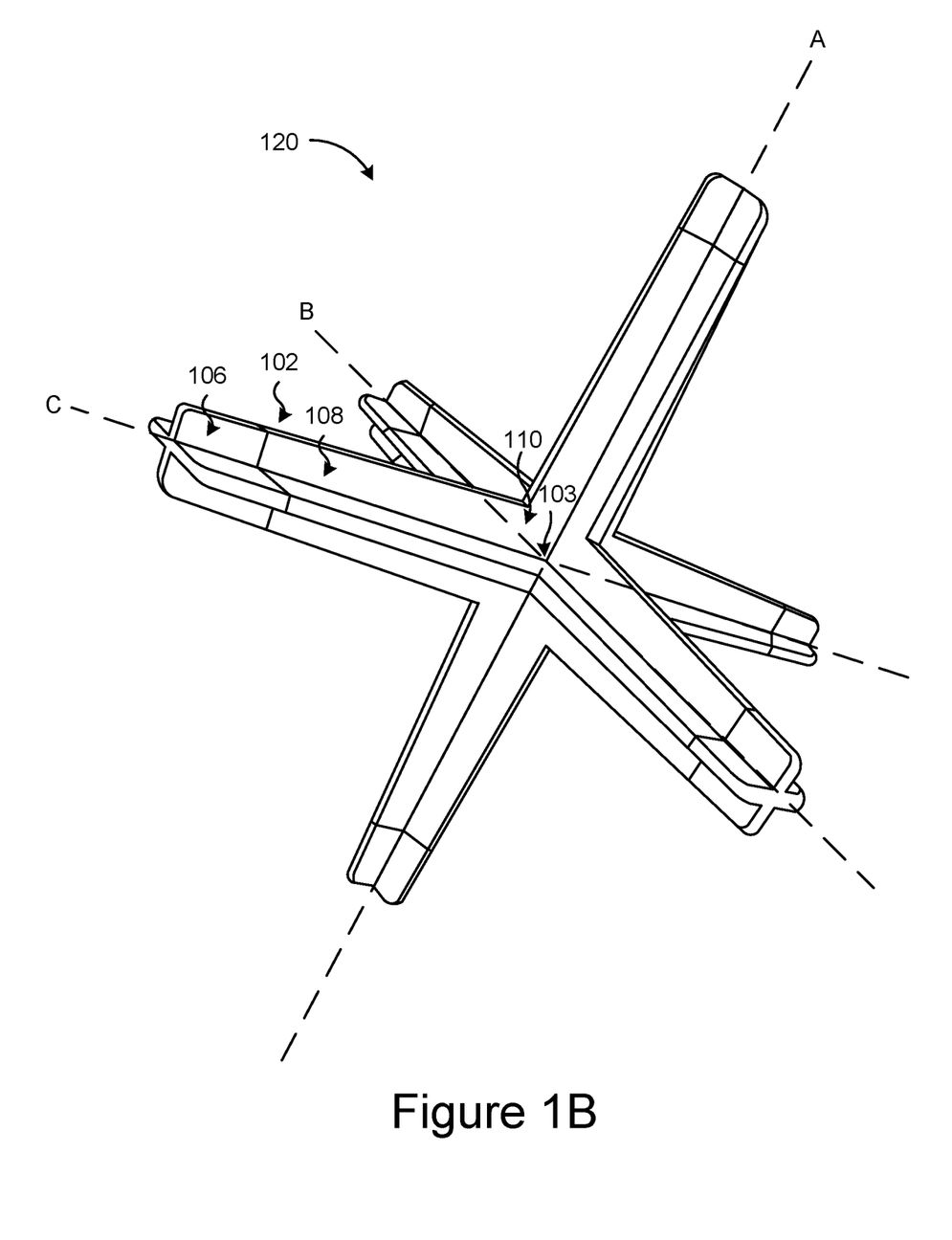
FIG. 1B is a perspective view of another embodiment of a spacer for supporting a manufactured structure in accordance with the subject matter disclosed herein.

FIG. 1B illustrates a perspective view of a spacer 120, which may be substantially similar to the spacer 100 depicted in FIG. 1A. As explained above, the spacer 120 may be made of different materials. For instance, in the depicted embodiment, the legs 102 from the proximal end and up to, but not including the distal ends 106 comprises a material that has a different melting point than the material that the distal ends 106 comprise.

In such an embodiment, the material for the distal ends 106 comprises a polymeric material and the material for the portion of the legs 102 from the proximal end and up to, but not including the distal ends 106, e.g., the portion of the elongate member 108 below the distal end 106 to the proximal end 110, comprises a metallic material.

In certain embodiments, the polymeric distal ends 106 comprise "tips" that are attached to or inserted into the metallic material of the legs 102. In such an embodiment, the polymeric distal ends 106 are attached to the metallic material by inserting a portion of the distal ends 106 into a channel in the legs 102, by being threaded onto the legs 102, by being molded onto the legs 102, by being snapped onto the legs 102, and/or the like.

In certain embodiments, the material for the portion of the legs 102 from the proximal end and up to, but not including the distal ends 106 is a polymeric material and the polymeric distal ends 106, e.g., the tips, are attached to the polymeric material in a similar fashion as they would be attached to the metallic material such that the polymeric spacers 100 are comprised of different sections and are not formed or molded in a unitary or singular fashion.

In certain embodiments, the different portions of the legs 102, e.g., the distal end 106 and the remaining elongate member 108 to the proximal end 110, are comprised of different colors to indicate the different materials or other characteristics of the materials, e.g., a melting point, rigidness, flexibility, strength, and/or the like. In some embodiments, the spacers 120 may have a color that matches the color of the structure being molded so that the spacers 120 are not visible from the outer/external surface of the molded structure.

Figure 2A:
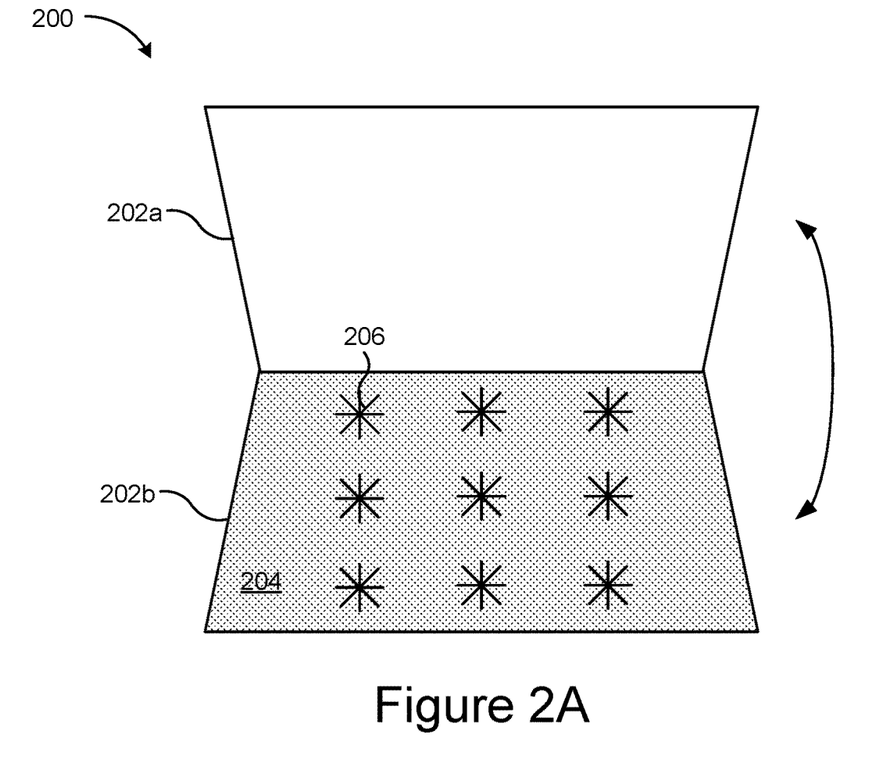
FIG. 2A is a perspective view of a mold for forming a structure in accordance with the subject matter disclosed herein.

FIG. 2A illustrates a mold 200 or cast for forming a structure. The mold 200 includes a first side 202a and a second side 202b, which when placed together forms a hollow mold for a structure. In one embodiment, a charge or shot weight of materials 204 that are used for molding the structure, e.g., polymers and other additives are added to the mold. In further embodiments, spacers 206, such as the spacers depicted in FIGS. 1A and/or 1B are also added to the materials 204 for providing additional support, strength, structure, or the like to the molded structure. In such an embodiment, the spacers 206 are positioned within the mold 200 and are securely held in place when the molding process begins by pressure applied to the spacers 206 from the first side 202a and the second side 202b. Thus, the spacers 206 may have a slightly larger size than the hollow or cavity region of the mold when the two sides 202a, 202b are placed together in order to be held in place when the two sides 202a, 202b are placed together.

The mold may be part of a rotational molding process such that the first side 202a and the second side 202b are placed together and secured, and then heated to a predefined temperature. The mold 200 may then be rotated to cause the softened materials to disperse and stick to the walls of the sides 202a, 202b of the mold 200. In order to maintain even thickness throughout the structure, the mold 200 continues to rotate at all times during the heating phase and to avoid sagging or deformation also during the cooling phase. During the heating phase, the distal ends 106 of the spacers 206 are also heated and softened or melted such that the distal ends stick to the surfaces that the materials 204 are being molding into. During cooling, the distal ends 106 of the spaces 206 are attached, bonded, melted, welded, or the like to each of the surfaces formed by the first side 202a and the second side 202b of the mold, as illustrated in FIG. 2B.

Figure 2B:
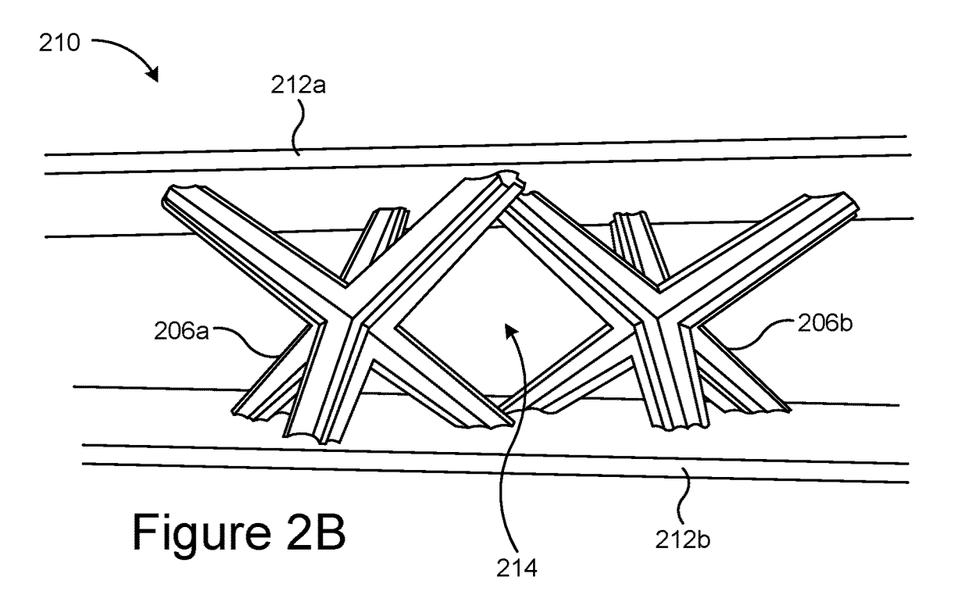
FIG. 2B is a perspective view of a plurality of spacers disposed between a first portion and a second portion of a manufactured structure in accordance with the subject matter disclosed herein.

FIG. 2B is a perspective view of one embodiment of a plurality of spacers 206 disposed between a first portion 212a and a second portion 212b of a manufactured structure 210 in accordance with one or more aspects of subject matter disclosed herein. In the illustrated embodiment, the plurality of spacers 206 includes a first spacer 206a and a second spacer 206b. While two spacers 206 are shown, fewer or more spacers 206 may be implemented into a manufactured structure 210 at a wide range of relative positions dependent, e.g., on the size of the cavity/hollow 214 between the first portion 212a and the second portion 212b, on the desired or designed structural strength or flexibility of the structure 210, and/or the like.

In the illustrated embodiment, the first spacer 206a and the second spacer 206b are positioned between the first portion 212a and the second portion 212b to support each of the first portion 212a and the second portion 212b relative to one another and maintain a size of the cavity 214, e.g., void or gap between the first portion 212a and the second portion 212b. The structural connection, formed by the spacers 206, between the first portion 212a and the second portion 212b may provide improved rigidity, resistance to damage, resistance to deflection, damage resistance, thermal handling, resistance to thermal expansion, and the like.

In some embodiments, the manufactured structure 210 may be a molded plastic structure such as a fence panel, a climbing wall, a play structure, an ice chest, a cooler, or the like. The structure 200 may be rotational molded, roto-molded, roto-casted, laminated, or the like. Other manufactured structures are also contemplated.

In some embodiments, the first spacer 206a and the second spacer 206b are positioned within a mold 200 during creation of the manufactured structure 210 to allow the spacers 206 to integrate into the first portion 212a and the second portion 212b to secure each of the components of the structure 210 together. In some embodiments, the spacers 206 melt, soften, attach, or otherwise bond to the first portion 212a and the second portion 212b at the corresponding points of contact near the distal ends 106 of the legs 102.

This bonding may be achieved through thermal (e.g., applying external heat to the mold 200 during the molding process), chemical, or other processes or interactions. In some embodiments, the spacers 206 are at least partially constructed of a thermoplastic which softens in response to an increase in temperature. This may be used to bond or otherwise couple the spacers 206 to the first portion 212a and/or the second portion 212b during manufacture, or in a post-processing operation.

As described herein, the first and second spacers 206a and 206b and the first and second portions 212a and 212b may each be made of the same or disparate materials. In some embodiments, different materials may be selected for the spacers 206 depending on a location and expected forces for the location on the manufactured structure 210. Likewise, the first portion 212a and the second portion 212b may be similar or disparate.

In other embodiments, the spacers 206 may be joined to the first portion 212a and the second portion 212b through mechanical means. For example, the spacers 206 may include a metal or other material which has sufficient strength to support pressing the spacer 206 into the material of the first portion 212a and/or the second portion 212b. For example, at least one of the first portion 212a and the second portion 212b may include a material while the spacers 206 are made of metal. The spacers 206 may be pressed into one or both of the first portion 212a and the second portion 212b through an application of pressure. The spacers 206 may include barbs, hooks, or other features or the like to retain the spacers 206 in one or both of the first portion 212a and the second portion 212b after pressing, molding, bonding, or the like.

Chemical bonding may be used in conjunction with other joining processes or as a standalone joining. For example, adhesives may be applied to bond the spacers 206 in place. Chemicals may also be used to soften one or both of the spacers 206 or the portions 212a and/or 212b to join together. Other joining or securing processes may also be used.

In some embodiments, the spacers 206 provide sufficient strength to the manufactured structure 210 that fillings and other gap-bridging approaches may be omitted. Nevertheless, the geometry of the spacers 206 does not prevent or hinder the use of thermal or acoustic insulation or other fills or layers which may provide additional beneficial characteristics for the manufactured structure 210.

The individual nature of the spacers 206 allows for customizable quantity and placement of the spacers 206 within the manufactured structure 210. The quantity, placement, and geometry of the spacers 206 may be determined or modified based on a wide range of criteria such as material properties, strength requirements, environmental conditions, wear characteristics, use, lifespan, manufacturing variable, or the like.

Additionally, due to the geometry of the spacers 206, the specific orientation of the spacers 206 during the placement of the spacers 206 between the first portion 212a and the second portion 212b may be flexible because the geometry allows for multiple points of contact at each portion and a self-positioning aspect which aligns those points of contact in a mold, press, or other assembly situation. Multiple points of contact created by the geometry of the spacers 206 can provide stability over multiple vectors to resist a wide range of forces and stresses that may be experienced by the manufactured structure 210. Furthermore, the support provided by the spacers 206 can be achieved without deforming the surface of the manufactured structure 210.

In one example, the spacers 206 may be sized to be slightly larger than a cavity 214 of a molding die 200. One or more spacers 206 may be arranged in the mold held in place by gravity, a framework, jig, or other approach. Closure of the molding die halves 202a, 202b or components may pin the spacers 206 in place and secure them via friction or other retaining forces. The molding process may then be run to incorporate the spacers 206 with the first and second portions 212a and 212b and form the manufactured structure 210.

Figure 3:
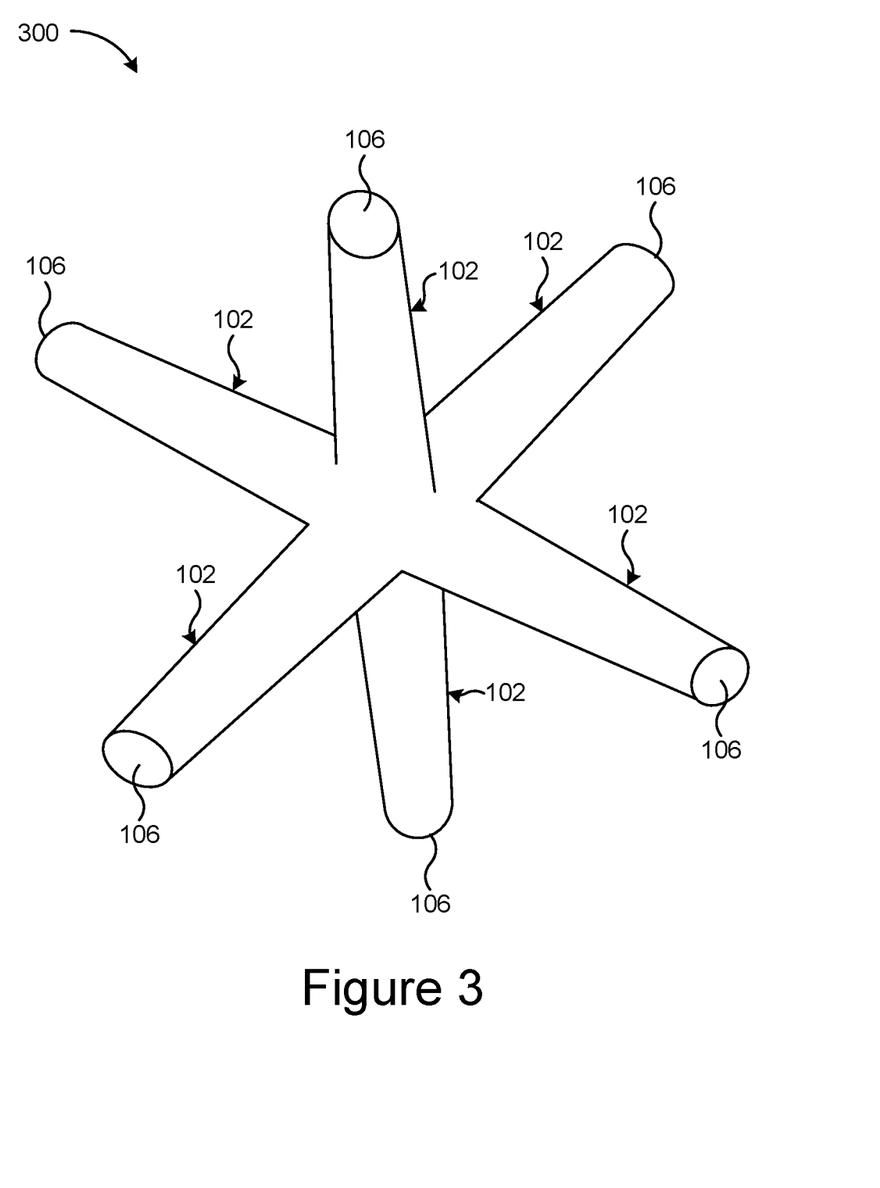
FIG. 3 is a perspective view of another embodiment of the spacer having an alternative geometry in accordance with the subject matter disclosed herein.

While embodiments shown in FIGS. 1A-1B and 2A-2B incorporate a particular cross-sectional geometry, FIG. 3 shows a perspective view of another embodiment of the spacer 300 having an alternative geometry in accordance with one or more aspects of the subject matter disclosed herein. In the illustrated embodiment, the spacer 300 includes legs 102 with a circular or rounded cross-section. In some embodiments, the spacer 300 includes a solid material or combination of materials while other embodiments incorporate one or more hollow portions within the spacer 300.

In the illustrated embodiment, the legs 102 are uniform in shape and length while other embodiments have one or more legs 102 that are different from another leg in at least one of shape, length, internal cavity, material, or the like. In some embodiments, each leg 102 is an inch long or more, a half inch long, a quarter inch long, and/or the like. The length, shape, and/or other characteristics of the spacer 300 may be dependent on the application that the spacers 300 are used for. While the illustrated embodiment includes a circular or rounded cross-section, other embodiments may include geometries which are rectangular, triangular, or the like. These geometries may be uniform for all the legs 102 or may vary in one or more legs 102 of the spacer 300.

In some embodiments, distal ends 106 of each leg 102 may have a specific geometry. The geometry of the distal ends 106 may be planar, as shown, or may include an angle, chamfer, fillet, concavity, convexity, point, barb, hook, flare, foot, texture, perforation, aperture, loop, or the like to facilitate a manufacturing process, interface with the manufactured structure (e.g., a certain geometry may mold, attach, weld, bond, or the like better to a particular surface or material than a different geometry), and/or performance characteristic of the finished manufactured product (e.g., geometries may have different characteristics such as strength, wear, robustness, and/or the like).

A spacer 300 may include legs 102 that have distal ends 106 with various different geometries, e.g., one distal end 106 may have a planar geometry, while another distal end 106 has an angled geometry, while another distal end 106 has a pointed geometry. In such an embodiment, such a spacer 300 may be completely formed of polymeric materials to include distal ends 106 with different geometries. In other embodiments, distal ends 106 having different geometries may be attached to or inserted into the legs 102 of a spacer 300, e.g., as a "tip" described above, which may be selected based on the application or requirements of the structure.

Figure 4:
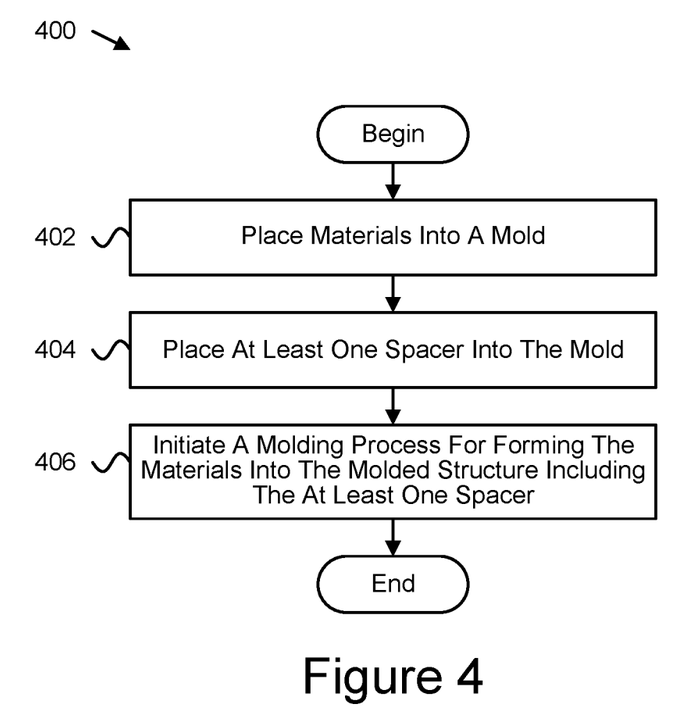
FIG. 4 is a flow chart diagram illustrating one embodiment of a method in accordance with the subject matter disclosed herein.

FIG. 4 depicts one embodiment of a method for forming a structure that includes spacers. In one embodiment, the method 400 begins by placing 402 materials into a mold to form a molded structure. In further embodiments, the method 400 includes placing 404 at least one spacer into the mold. In such an embodiment, the at least one spacer includes a plurality of legs where each leg includes an elongate member that extends from a proximal end to a distal end. The proximal end of each leg is connected to one another at a central point such that the legs are spaced radially about the central point and substantially equidistant from one another. The distal ends of the legs include a material that has a predefined melting point such that the distal ends attach to a surface in contact with the distal ends responsive to the predefined melting point being reached during a molding process.

In further embodiments, the method 400 includes initiating 406 a molding process for forming the materials into the molded structure such that the at least one spacer is located within a cavity of the molded structure and are configured to provide structural support to the molded structure by adhering to different surfaces of the molded structure during the molding process, and the method 400 ends.

There is thus disclosed a spacer for manufactured structures that provides stability to the manufactured structure. It will be appreciated that numerous changes may be made to the present invention without departing from the scope of the claims The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of forming a molded structure, comprising:
    placing materials into a mold;
    placing at least one spacer into the mold, the at least one spacer comprising at least two pairs of opposing legs, each of the legs comprising an elongate member that extends from a proximal end to a distal end thereof, the proximal end of each of the legs connected to one another at a central point such that the legs are spaced radially about the central point substantially equidistant from one another, and the distal ends of the legs comprising a material that has a predefined melting point such that the distal ends attach to a respective surface of the molded structure in contact with the distal ends responsive to the predefined melting point being reached during a rotational molding process; and
    initiating the molding process so as to form the materials into the molded structure such that the at least one spacer is located within a cavity of the molded structure and such that the at least one spacer provides structural support to the molded structure by adhering to different surfaces of the molded structure during the molding process by said predefined melting point being reached, the different surfaces of the molded structure defining said cavity.

2. The method of claim 1, wherein the legs from the proximal ends and up to, but not including, the distal ends comprises a material that has a different melting point than the material that the distal ends comprise.

3. The method of claim 2, wherein the material for the distal ends comprises a polymeric material and the material for the legs from the proximal ends and up to, but not including, the distal ends comprises a metallic material.

4. The method of claim 3, wherein the polymeric distal ends are attached to the metallic material of the legs by inserting a portion of the distal ends into a channel in the legs, by being threaded onto the legs, by being molded onto the legs, and/or by being snapped onto the legs.

5. The method of claim 3, wherein the polymeric material comprises a combination of a plurality of different polymers and additives.

6. The method of claim 2, wherein the material for the distal ends comprises a different color than the material for the legs from the proximal ends and up to, but not including the distal ends.

7. The method of claim 1, wherein the spacer is completely formed of polymeric materials.

8. The method of claim 1, wherein the distal ends attach to the respective surfaces by at least one of a chemical bond and a mechanical bond.

9. The method of claim 1, wherein at least a pair of the legs are oriented opposite one another along a linear axis.

10. The method of claim 9, wherein the at least a pair of legs oriented opposite one another along a linear axis are oriented perpendicular to another pair of legs of the at least two pairs of legs that are oriented opposite one another along a different linear axis.

11. The method of claim 10, wherein the at least two pairs of legs comprises three pairs of legs, each pair of the legs oriented along a respective linear axis that is perpendicular to a different linear axis that a different pair of the legs is oriented along.

12. The method of claim 9, wherein a length of the at least a pair of legs oriented opposite one another along a linear axis, from a distal end of a first leg of the pair to a distal end of a second leg of the pair is longer than a length of a cavity of the mold used in the molding process.

13. The method of claim 1, wherein each of the legs is uniform in shape and length.

14. The method of claim 1, wherein at least one leg of the at least two pairs of legs has a shape and/or length that is different than the other legs of the at least two pairs of legs.

15. The method of claim 1, wherein the legs gradually narrow along the elongate member from the proximal end to the distal end.

16. The method of claim 1, wherein the at least two pairs of legs comprises three pairs of legs, wherein one of each of the three pairs of legs is adhered to one of the surfaces of the molded structure, and wherein another of each of the three pairs of legs is adhered to the other of the surfaces of the molded structure.

17. The method of claim 1, wherein the legs each comprise a cross-sectional geometry selected from the group consisting of square, triangular, round, or diamond.

18. The method of claim 1, wherein the molded structure is a fence panel, a climbing wall, a play structure, an ice chest, or a cooler.

19. The method of claim 1, wherein one or more of the distal ends have a planar geometry.

20. The method of claim 1, wherein one or more of the distal ends comprise an angle, chamfer, fillet, concavity, convexity, point, barb, hook, flare, foot, texture, perforation, aperture, or loop.

* * * * *